United States Patent
Roll et al.

(10) Patent No.: US 9,873,416 B2
(45) Date of Patent: Jan. 23, 2018

(54) METHOD FOR OPERATING A BRAKE SYSTEM FOR MOTOR VEHICLES AND A BRAKE SYSTEM IN WHICH THE METHOD IS CARRIED OUT

(71) Applicant: Continental Teves AG & Co. oHG, Frankfurt (DE)

(72) Inventors: Georg Roll, Frankfurt (DE); Jürgen Böhm, Oberneisen (DE); Marco Besier, Bad Schwalback (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 0 days.

(21) Appl. No.: 14/779,499

(22) PCT Filed: Mar. 4, 2014

(86) PCT No.: PCT/EP2014/054146
§ 371 (c)(1),
(2) Date: Sep. 23, 2015

(87) PCT Pub. No.: WO2014/154450
PCT Pub. Date: Oct. 2, 2014

(65) Prior Publication Data
US 2016/0039398 A1    Feb. 11, 2016

(30) Foreign Application Priority Data

Mar. 25, 2013  (DE) .................. 10 2013 205 182
Oct. 30, 2013  (DE) .................. 10 2013 222 061

(51) Int. Cl.
*B60T 8/32*  (2006.01)
*B60T 8/40*  (2006.01)

(52) U.S. Cl.
CPC ............ *B60T 8/326* (2013.01); *B60T 8/4081* (2013.01)

(58) Field of Classification Search
CPC ........ B60T 8/326; B60T 8/4081; B60T 8/5037
See application file for complete search history.

(56) References Cited

U.S. PATENT DOCUMENTS

| 4,538,228 A | * | 8/1985 | Brearey | ................ B60T 8/1705 303/122.09 |
| 6,007,161 A | * | 12/1999 | Worsdorfer | ............ B60T 7/042 303/115.2 |

(Continued)

FOREIGN PATENT DOCUMENTS

| DE | 10 2011 076 675 A1 | 12/2011 |
| EP | 0 199 352 A1 | 10/1986 |

(Continued)

OTHER PUBLICATIONS

PCT International Search Report—dated Feb. 5, 2014.
German Examination Report—dated Jul. 4, 2014.

*Primary Examiner* — Bradley King
*Assistant Examiner* — James Hsiao
(74) *Attorney, Agent, or Firm* — Brinks Gilson & Lione (57) ABSTRACT

An electrohydraulic brake system method for motor vehicles having a wheel-specific brake control function (ABS, ESC, TCS) and hydraulically actuable wheel brakes (43, 44, 45, 46), communicating with an electrically controllable pressure supply device. The pressure supply device (40) having a cylinder-based piston arrangement with a pressure space driven by an electromechanical actuator (2, 4). To set a brake system pressure (Psys) wherein a wheel-specific wheel setpoint pressure (Pi) is predefined for each wheel brake, and a pressure regulating process (301) is carried out, wherein at certain times a control process (303) of the pressure medium volume which is output by the pressure supply device is carried out instead of the pressure regulating process (301) of the brake system pressure, switching over (302) from the pressure regulating process to the control of the pressure (Continued)

medium volume is carried out as a function of the wheel setpoint pressures (Pi).

14 Claims, 7 Drawing Sheets

(56) References Cited

U.S. PATENT DOCUMENTS

| | | | |
|---|---|---|---|
| 6,036,285 A | 3/2000 | Murphy | |
| 6,315,370 B1* | 11/2001 | Feigel | B60T 7/042 303/113.4 |
| 2010/0191432 A1* | 7/2010 | Fuchs | B60L 7/06 701/70 |
| 2011/0115282 A1* | 5/2011 | Dinkel | B60T 7/042 303/3 |
| 2012/0065861 A1* | 3/2012 | Hartmann | B60T 8/17558 701/71 |
| 2014/0368027 A1* | 12/2014 | Bohm | B60T 8/4081 303/14 |
| 2015/0224972 A1* | 8/2015 | Feigel | B60T 8/4081 303/15 |

FOREIGN PATENT DOCUMENTS

| | | |
|---|---|---|
| EP | 0 927 671 A2 | 7/1999 |
| WO | WO 2010/029812 A1 | 3/2010 |
| WO | WO 2011/029812 A1 | 3/2011 |
| WO | WO 2012/010475 A1 | 1/2012 |

* cited by examiner

METHOD FOR OPERATING A BRAKE SYSTEM FOR MOTOR VEHICLES AND A BRAKE SYSTEM IN WHICH THE METHOD IS CARRIED OUT

CROSS REFERENCE TO RELATED APPLICATIONS

This application claims priority to German Patent Application Nos. 10 2013 205 182.4, filed Mar. 25, 2013; 10 2013 222 061.8, filed Oct. 30, 2013; and PCT/EP2014/054146, filed Mar. 4, 2014.

FIELD OF THE INVENTION

The invention relates to a method for controlling a brake system for motor vehicles and to an electrohydraulic brake system.

BACKGROUND

"Brake-by-wire" brake systems are being used ever more widely in motor vehicle engineering. Such brake systems often comprise not only a brake master cylinder that can be actuated by the vehicle driver but also an electrically controllable pressure supply device, by means of which actuation of the wheel brakes, either directly or via the brake master cylinder, takes place in the "brake-by-wire" operating mode. In order to give the vehicle driver a pleasant pedal feel in the "brake-by-wire" operating mode, such brake systems generally have a brake-pedal-feel simulator, which is in operative connection with the brake master cylinder, for example. To control the brake system, a setpoint device is provided, the device evaluating the electrical signals from one or more sensors for detecting the driver's braking intention (actuating intention), for example, in order to determine a setpoint value for control of the pressure supply device. In these brake systems, however, the pressure supply device can also be actuated without active intervention by the driver on the basis of electronic signals. These electronic signals can be output by an electronic stability program (ESC) or a headway control or adaptive cruise control (ACC) systems, for example, the setpoint device thus determining a setpoint value for control of the pressure supply device from these signals.

A method for controlling an electrohydraulic brake system for motor vehicles having an electronically controllable pressure supply device, which is connected to hydraulically actuable wheel brakes, is described in DE 10 2011 076 675 A1. The pressure supply device comprises a cylinder-piston arrangement with a hydraulic pressure space, the piston of which can be moved relative to a rest position by an electromechanical actuator. For closed-loop pressure control, an actual value for the inlet pressure and a setpoint value for the inlet pressure are determined, these being fed as input variables to a controller, which sets the corresponding setpoint value for the inlet pressure in the hydraulic pressure space.

In WO 2012/010475 A1, the proposal is that the pressure in the hydraulic pressure space of the pressure supply device should correspond to the respective highest setpoint wheel pressure of the wheel brakes during antilock control, wherein at least one wheel brake with the highest setpoint wheel pressure is connected to the hydraulic pressure space via the open inlet valve to give complete pressure equalization between the wheel brake and the pressure space. The system pressure of the pressure supply device is set to the highest setpoint wheel pressure by means of pure closed-loop pressure control.

Among the disadvantages of the closed-loop pressure control of the system/inlet pressure of the pressure supply device as described in WO 2012/010475 A1 and DE 10 2011 076 675 A1 is the fact that, in the case of a desired pressure buildup at one wheel brake, there can be a brief, unwanted drop in the system/inlet pressure and hence an unwanted pressure reduction at another wheel brake when the associated inlet valve of the first wheel brake is opened, before the system or inlet pressure drop can be balanced out again by the closed-loop pressure control system. Accurate and stable setting of the pressure at the wheel brakes is thus not always guaranteed.

It is therefore the object of the present invention to provide a method for operating an electrohydraulic brake system for motor vehicles and to provide a brake system, which method and system allow improved, wheel-specific setting of the pressure at the wheel brakes. In this context, the setting of the pressure at the wheel brakes should be as precise but also as comfortable as possible.

According to the invention, this object is achieved by a method and by a brake system as described herein.

SUMMARY AND INTRODUCTORY DESCRIPTION

The invention is based on the consideration that at certain times open-loop control of the pressure medium volume which is output by the pressure supply device is carried out instead of closed-loop pressure control of the brake system pressure. Here, a switchover from closed-loop pressure control to open-loop control of the pressure medium volume is carried out in accordance with the setpoint wheel pressures which are specified for the wheel brakes. It is thereby possible to achieve precise setting of the wheel brake pressures, in particular without an unwanted drop in any one wheel brake pressure, in accordance with the desired modulation situation of the wheel brake pressures.

It is preferable if open-loop control of the pressure medium volume which is output by the pressure supply device is carried out instead of closed-loop pressure control of the brake system pressure at certain times during a wheel-specific closed-loop brake control function, i.e. when the setpoint wheel pressures set at the wheel brakes are supposed to differ, at least in some cases.

In the closed-loop pressure control of the brake system pressure, the brake system pressure is preferably adjusted to the highest of the setpoint wheel pressures or to a setpoint pressure higher than the highest setpoint wheel pressure by a specified amount.

The open-loop control of the pressure medium volume is preferably carried out or there is preferably a switchover to open-loop control of the pressure medium volume when a wheel-specific brake pressure increase is to be carried out at least one wheel brake.

During the open-loop control of the pressure medium volume, the piston of the pressure supply device is preferably moved by a position value, with the result that a pressure medium volume determined by means of the specified setpoint wheel pressures is displaced into at least one wheel brake. In other words, during the open-loop control of the pressure medium volume, the piston of the pressure supply device is moved by a position value which is determined from the specified setpoint wheel pressures. As a result, the movement of the piston is carried out very quickly, during the demand for a pressure buildup itself. There is no need to detect a system deviation in the brake system pressure.

The position value is preferably determined by means of at least one pressure/volume characteristic specified for the wheel brake or the wheel brakes.

In the case of a brake pressure increase at just one wheel brake, a pressure medium volume required for the wheel brake is preferably determined by means of the pressure/volume characteristic specified for this wheel brake and of the setpoint wheel pressure of this wheel brake, and the change in the position of the piston (movement of the piston) is then determined from said pressure medium volume.

In the case of a brake pressure increase at two or more wheel brakes simultaneously, the position value or position displacement is preferably determined by means of a sum of pressure medium volumes of the wheel brakes which is required for said wheel brakes. As a particularly preferred option, a required pressure medium volume of each wheel brake at which a brake pressure increase is to be carried out is determined for said wheel brake by means of the pressure/volume characteristic specified for said wheel brake and of the setpoint wheel pressure of said wheel brake, and the required pressure medium volumes of the two or more wheel brakes are added.

In the case of a brake pressure increase at two or more wheel brakes, a wheel-specific brake pressure increase at said wheel brakes is preferably accomplished through a suitable choice of wheel-specific opening durations for the corresponding inlet valves. As a particularly preferred option here, the inlet valves are opened at the same time. As a particularly preferred alternative option, the inlet valves are opened with a time delay. In the case of a time delay, the reliability of precise implementation of the desired setpoint pressures is greater.

The opening instant of the inlet valves is preferably correlated temporally with the movement of the piston. As a particularly preferred option, the opening instant of the inlet valves and the start of movement of the piston are chosen to be simultaneous.

According to a development of the method according to the invention, a phase of closed-loop pressure control of the brake system pressure is carried out after the completion of a phase of open-loop control of the pressure medium volume. Any pressure deviations due to inaccuracies in the model used in open-loop control can thereby be eliminated. In particular, a closed-loop pressure control phase is also carried out when no further change in the brake pressure is to be carried out.

The system preferably switches back from open-loop control of the pressure medium volume to closed-loop pressure control of the brake system pressure when either holding or reduction of the brake pressure is to be carried out for each of the wheel brakes.

At the beginning of the closed-loop pressure control phase, a deviation between the measured brake system pressure and the specified brake system pressure is preferably determined. Using the deviation, a correction of a model for the open-loop control of the pressure medium volume is carried out.

According to a preferred embodiment of the method according to the invention, a correction factor is determined by means of the deviation and of a pressure/volume characteristic. It is advantageous if the correction factor is determined separately for each wheel brake, i.e. in a wheel-specific manner. It is likewise particularly preferred that the correction factor be determined in accordance with the wheel brake pressure, i.e. that a respective correction factor be determined for different wheel brake pressure ranges.

Preferably, a corrected pressure medium volume for a wheel brake in a subsequent phase of open-loop control of the pressure medium volume is determined by means of the correction factor.

The invention also relates to a brake system for motor vehicles, in the electronic open-loop and closed-loop control unit of which a method according to the invention is carried out.

The method according to the invention is preferably carried out in a brake system for motor vehicles, which, in a "brake-by-wire" operating mode, can be controlled both by the vehicle driver and independently of the vehicle driver, preferably being operated in the "brake-by-wire" operating mode and being capable of being operated in at least one fallback operating mode, in which only operation by the vehicle driver is possible.

It is likewise preferred if the hydraulic pressure space of the cylinder-piston arrangement is connected or can be connected to the pressure medium reservoir.

BRIEF DESCRIPTION OF THE DRAWINGS

Further preferred embodiments of the invention will become apparent from the dependent claims and from the following description with reference to figures, of which.

DETAILED DESCRIPTION

Figure 1:
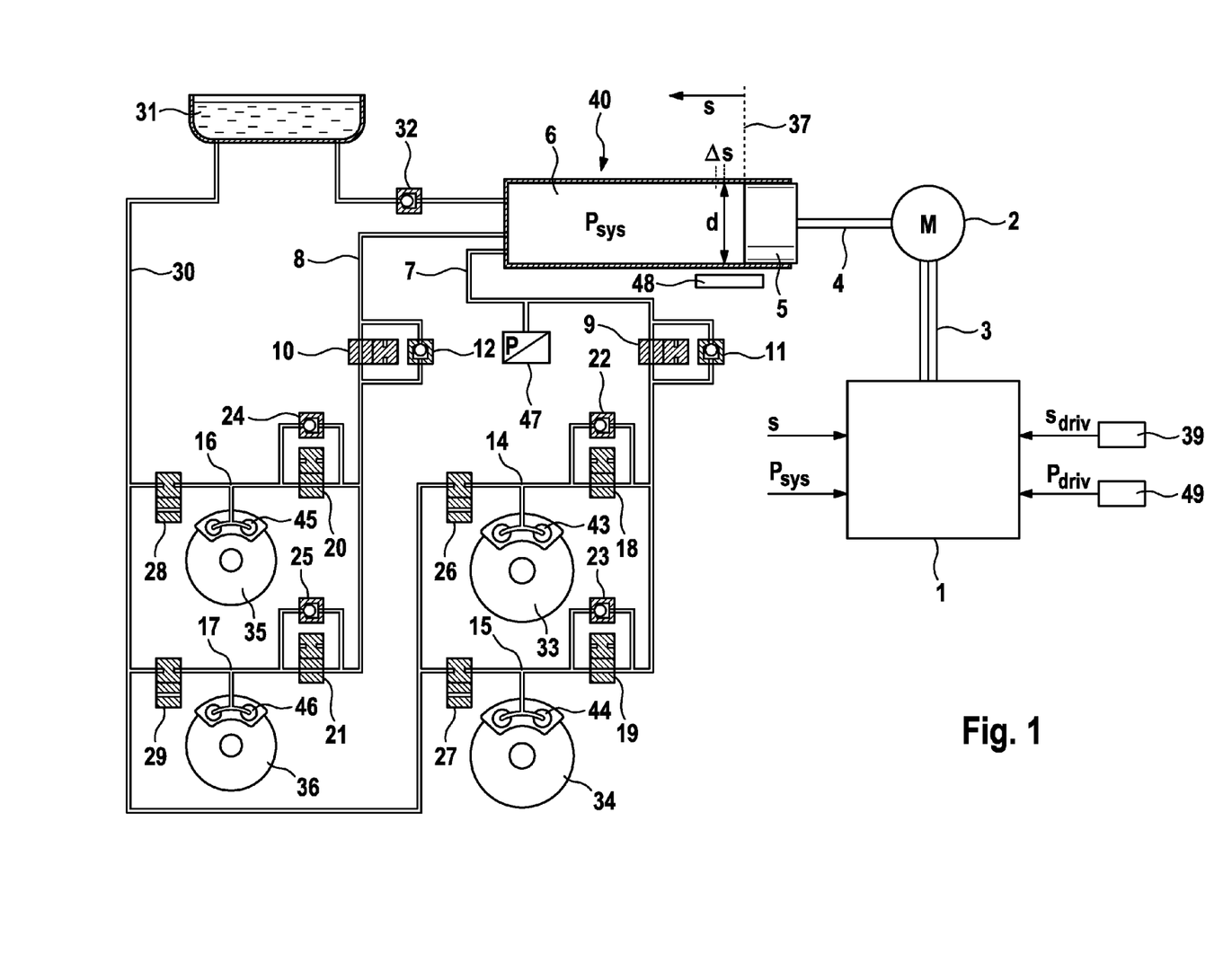
FIG. 1 shows a basic schematic diagram of a brake system according to one example for carrying out a method according to the invention.

FIG. 1 shows a basic diagram of an electrohydraulic brake system, according to one example, for motor vehicles for carrying out a method according to the invention. According to the example, the brake system includes four hydraulically actuable wheel brakes 43, 44, 45, 46, wherein a dual-circuit brake embodiment with axle-wise circuit division (black/white division) is assumed by way of example, i.e. wheel brakes 43, 44 are assigned to the front wheels 33, 34 and wheel brakes 45, 46 are assigned to the rear wheels 35, 36.

The brake system includes an electrically controllable pressure supply device 40, wherein each wheel brake 43, 44, 45, 46 is disconnectably connected to the pressure supply device 40 via an inlet valve 18, 19, 20, 21. According to the example, each wheel brake 43, 44, 45, 46 is furthermore connected or can furthermore be connected to a pressure medium reservoir 31 via an outlet valve 26, 27, 28, 29. According to the example, a check valve 22, 23, 24, 25 opening in the direction of the pressure space 6 is connected in parallel with all the inlet valves 18-21 to ensure that a wheel pressure level can never be above the level of the central pressure space as long as the sequence valves 9 and 10 are open. Pressure supply device 40 includes a cylinder-piston arrangement with a hydraulic pressure space 6, the (plunger) piston 5 of which can be moved by an electromechanical actuator including an electric motor 2 and a suitable mechanism 4 (e.g. a rotation-translation mechanism or a rotation-rotation mechanism with a rotation-translation mechanism on the output side).

In the dual-circuit brake system shown here by way of example, a pressure medium supply having a line 7 containing a sequence valve 9 is provided for the wheel brake circuits 14, 15 of the front wheels 33, 34, and a separate pressure medium supply including a line 8 containing a sequence valve 10 is provided for the wheel brake circuits 16, 17 of the rear wheels 35, 36. The dual circuit construction of the system is advantageous for safety reasons but is not essential to the invention. It would likewise be possible, for example, for the wheel brake circuits 14-17 to be connected to the pressure space 6 by a common line segment. In another variant of the brake system, lines 7 and 8 can also each be connected to diagonally opposite wheel brakes (in each case one front wheel and the diagonally opposite rear wheel).

The brake system according to the example includes a detection device (sensor) 47 for determining the brake system pressure $P_{sys}$ of the pressure supply device 40, e.g. in the form of a pressure sensor.

A detection device (sensor) 48 for determining a position of the pressure supply device is furthermore provided. The position can be, for example, the location/position s of the piston 5 or a position of the actuator 2, 4, e.g. the location of the rotor of the electric motor 2.

Moreover, an electronic open-loop and closed-loop control unit 1 for controlling the electromechanical actuator 2 and the valves 9, 10, 18-21, 26-29 of the brake system is provided. According to the example, open-loop and closed-loop control unit 1 is connected to electric motor 2 by power supply lines 3 to allow control of the electromechanical actuator. The information on the position s of the pressure supply device, as determined by means of detection device 48, and the brake system pressure $P_{sys}$ of the pressure supply device, as determined using detection device 47, is fed to the open-loop and closed-loop control unit 1.

In the brake system shown, the driver makes a pressure demand by actuating the brake pedal. The brake pedal actuation is measured by suitable sensors 39, 49, which detect a brake pedal travel $S_{driv}$ and an actuating pressure (or an actuating force) $P_{driv}$, for example, and the information $S_{driv}$, $P_{driv}$ is fed to the open-loop and closed-loop control unit 1. A corresponding pressure demand for the pressure supply device (setpoint value for the brake system pressure) is determined by the open-loop and closed-loop control unit 1 and implemented in the hydraulic pressure space 6 with the aid of actuator 2, 4 and plunger piston 5, with the piston 5 traveling by a distance s from its rest position 37, with the result that a certain volume of the pressure medium is displaced from the pressure space 6 into the wheel brake circuits 14-17 via lines 7, 8, the open sequence valves 9, 10 and the initially open inlet valves 18-21. A corresponding brake pressure is thus produced in the wheel brakes 43-46.

A brake pressure reduction at all the wheel brakes 43-46 can be brought about by moving the piston 5 back in the direction of the rest position 37. A rapid and wheel-specific brake pressure reduction, as required in the case of an ABS control operation, advantageously proceeds via the valve combination comprising the inlet and outlet valve, in the case of the example of wheel brake 43 the procedure being such that inlet valve 18 is closed and outlet valve 26 is opened for a certain time. Pressure medium then flows out of wheel brake 43 through outlet valve 26 and thus via a line 30 into the pressure medium reservoir 31. Retraction of the piston 5 would reduce the pressure equally in all the wheel brake circuits 14-17, even if inlet valve 19 were to be closed, for example, to maintain the pressure in wheel brake circuit 15. The return flow of pressure medium would then take place completely via check valve 23, which bypasses inlet valve 19.

According to the example, the pressure space 6 of the pressure supply device 40 is connected to the pressure medium reservoir 31 by a line containing a check valve 32, thus allowing the pressure space 6 to be supplied with pressure medium volume via the check valve 32 when the piston 5 moves back, if pressure medium volume has previously been released into the reservoir 31 via one of the outlet valves 26-29.

Figure 2:
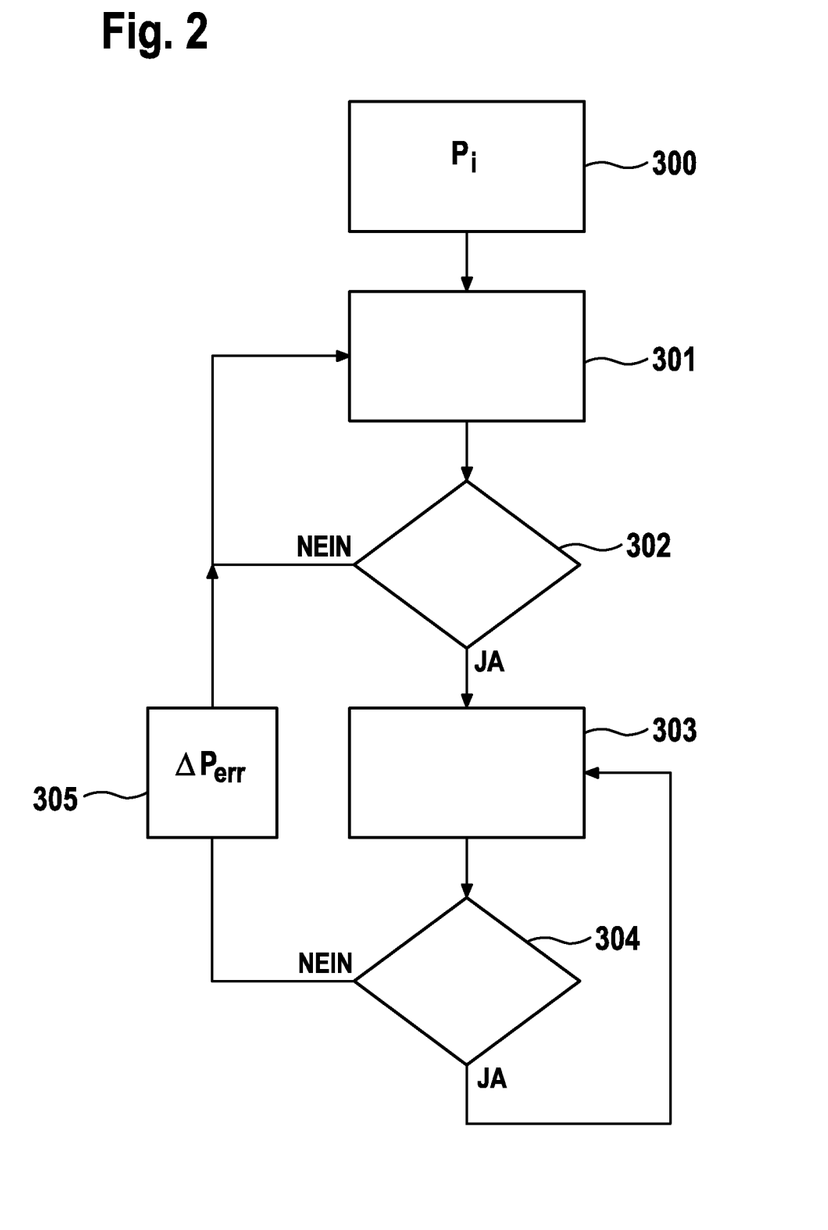
FIG. 2 shows a diagrammatic illustration of a method according to one example.

FIG. 2 shows a diagrammatic illustration of a method according to one example for setting a suitable brake system pressure profile in the central pressure space 6 of the pressure supply device 40. In a closed-loop brake control function (not shown in FIG. 2), e.g. a wheel slip control operation (e.g. ABS (antilock brake system)) or a vehicle dynamics control operation (e.g. ESC (Electronic Stability Control)), a wheel-specific setpoint wheel pressure $p_i$ (e.g. where i=43, 44, 45, 46) is determined for each wheel brake (e.g. wheel brakes 43, 44, 45, 46 in FIG. 1). The specified wheel-specific setpoint wheel pressures $p_i$ are then available for the method according to the example (block 300).

In block 301, a closed-loop brake system pressure control operation, i.e. closed-loop control of the brake system pressure $P_{sys}$ of the pressure supply device, is carried out. For this purpose, a suitable setpoint value for the brake system pressure is determined from the wheel-specific setpoint wheel pressures $p_i$, and this value is set. For this purpose, use is made, for example, of a pressure regulator, by which the measured brake system pressure $P_{sys}$ (actual value) is adjusted to the setpoint value by corresponding positioning of the piston 5. It is advantageous if the setpoint value for the brake system pressure corresponds to the highest pressure demand of all the wheel brake circuits, i.e. the highest setpoint wheel pressure. In order reliably to supply the wheel brake having the highest setpoint wheel pressure with sufficient pressure, it is possible, as an alternative, for the selected setpoint value for the brake system pressure always to be higher than the highest setpoint wheel pressure by a specified amount ($\Delta$), i.e. the setpoint value for the brake system pressure corresponds to the highest setpoint wheel pressure plus the specified amount $\Delta$.

If a specified pressure modulation situation of the wheel brakes is detected in block 302 from the specified setpoint wheel pressures $p_i$ (YES in block 302), open-loop control of the pressure medium volume output or received by the pressure supply device (open-loop volume control) is carried out in block 303 instead of the closed-loop control of the brake system pressure (see block 301). That is to say that a switch over from closed-loop control of the brake system pressure (block 301) to open-loop control of the pressure medium volume (block 303) is carried out in accordance with the setpoint wheel pressures $p_i$ specified for the wheel brakes.

It is advantageous if the systems switches over to the open-loop control mode when at least one wheel brake circuit demands an independent brake pressure increase.

In the open-loop control mode (block 303), the plunger piston 5 is then in each case moved by a position value $\Delta s$, which pushes the pressure medium volume ΔV necessary for the pressure buildup at the wheel brake or brakes into the wheel brake or wheel brakes which has/have made the demand for the pressure buildup.

In the case where a brake pressure buildup is to be carried out only at a single wheel brake, the position value Δs by which the piston 5 is moved in the case of the open-loop (feedforward) volume control is preferably determined using a specified pressure/volume characteristic of the wheel brake which requires the independent pressure buildup. Here, the use of the equation Δs=ΔV/A is particularly preferred for calculation for the sake of simplicity. Here, ΔV is the volume required by the wheel brake, which is determined by using the specified pressure/volume characteristic, and A is the area of the plunger piston 5, e.g. $A=\pi*(d/2)^2$ in the case of a cylindrical plunger piston, where d is the diameter of the plunger piston.

In the case where brake pressure is to be increased simultaneously (in one time segment of the open-loop control) at a plurality of wheel brakes j, the position value Δs by which the piston 5 is moved is preferably calculated from the required total volume $\Delta V_{sum}$ of all these wheel brakes j (i.e. $\Delta V_{sum}$ is the sum of the individual volumes $\Delta V_j$ of the wheel brakes j). The volume $\Delta V_j$ required by a wheel brake j is determined by using a specified pressure/volume characteristic. In this case, the same pressure/volume characteristic can be specified for all the wheel brakes, or wheel-brake-specific pressure/volume characteristics can be specified. As a particularly preferred option, the respective (wheel-brake-)specific pressure buildup is accomplished by setting a suitable activation duration for the opening of the inlet valve assigned to the respective wheel brake, wherein the activation instant (start of activation) of all the inlet valves affected is the same and is chosen so that valve opening is temporally correlated with the movement of the plunger piston 5.

Alternatively, where brake pressure has to be increased at a plurality of wheel brakes simultaneously (in one time segment of the open-loop control), the procedure is in principle the same as that described in the previous paragraph, although, in contrast, the activation instants (start of activation) for the inlet valves affected are chosen with a time delay.

If the specified pressure modulation situation which has triggered the switchover to open-loop volume control is no longer present or if a second specified pressure modulation situation is present (in both cases NO in block 304), the system switches back to closed-loop control of the brake system pressure (block 301).

It is advantageous if the system switches back to closed-loop control of the brake system pressure when all the wheel brakes have to be held at unchanged pressure levels or are demanding an independent pressure reduction (via their outlet valves). For example, the system switches to closed-loop control of the brake system pressure when two wheel brakes are demanding pressure maintenance and two wheel brakes are demanding a pressure reduction.

According to the example, a deviation $\Delta P_{err}$ (difference) of the measured brake system pressure $P_{sys}$ from a setpoint pressure for the brake system pressure is determined in block 305 immediately after the expiry of the open-loop volume control mode, i.e. immediately at the beginning of a subsequent closed-loop pressure control phase. For this purpose, the setpoint pressure selected is preferably the maximum of all the wheel brake pressures $p_i$ demanded. The deviation $P_{err}$ is used to carry out a model correction for the (next) open-loop control phase.

According to the example, the model correction is performed by means of the following steps:

a) fundamentally, a necessary correction factor $K_{mod}$ is determined only if pressure has been built up at an individual wheel brake and a specified minimum time interval (of 10 ms, for example), in which no other wheel brake demands a pressure buildup, then occurs.

b) a system pressure deviation $\Delta P_{err}$ that is detectable immediately after the pressure buildup is used to determine a volume error $\Delta V_{err}$ by using the pressure/volume characteristic of the wheel with the highest brake pressure.

c) a correction factor is formed from the volume error $\Delta V_{err}$ in accordance with $K_{mod}=(1+(\Delta V_{err}/(n*\Delta V)))$, (where n=1 or 2).

d) a dedicated table containing correction factors $K_{mod,i}$ for various pressure ranges (e.g. for 0-10 bar, 10-20 bar, 20-35 bar, 35-50 bar, 50-70 bar, 70-100 bar and 100-200 bar) is set up for each wheel brake i (e.g. in the open-loop and closed-loop control unit 1). It is advantageous here if a correction factor newly determined for a pressure range is stored in the corresponding place in the table or multiplied by a correction factor already present there and then stored.

e) if an independent pressure buildup is carried out at one wheel brake, the volume ΔV required for this purpose is first of all determined. The current pressure level P (i.e. the measured brake system pressure $P_{sys}$) is then used to determine the corresponding place in the correction table for this wheel. If a correction factor $K_{mod}$ has been stored there, they corrected volume requirement is determined using the equation $\Delta V_{korr}=K_{mod}*\Delta V$.

Figure 3:
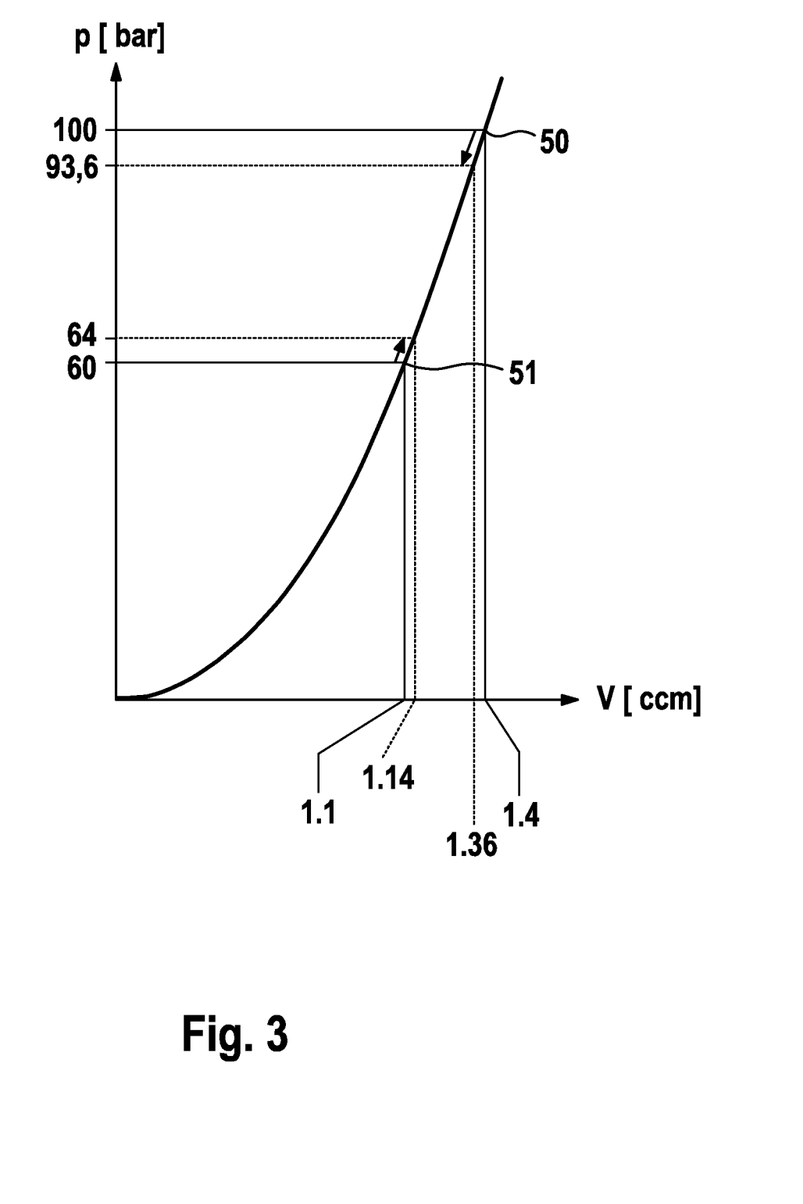
FIG. 3 shows an illustrative pressure/volume characteristic of a wheel brake.
Figure 4:
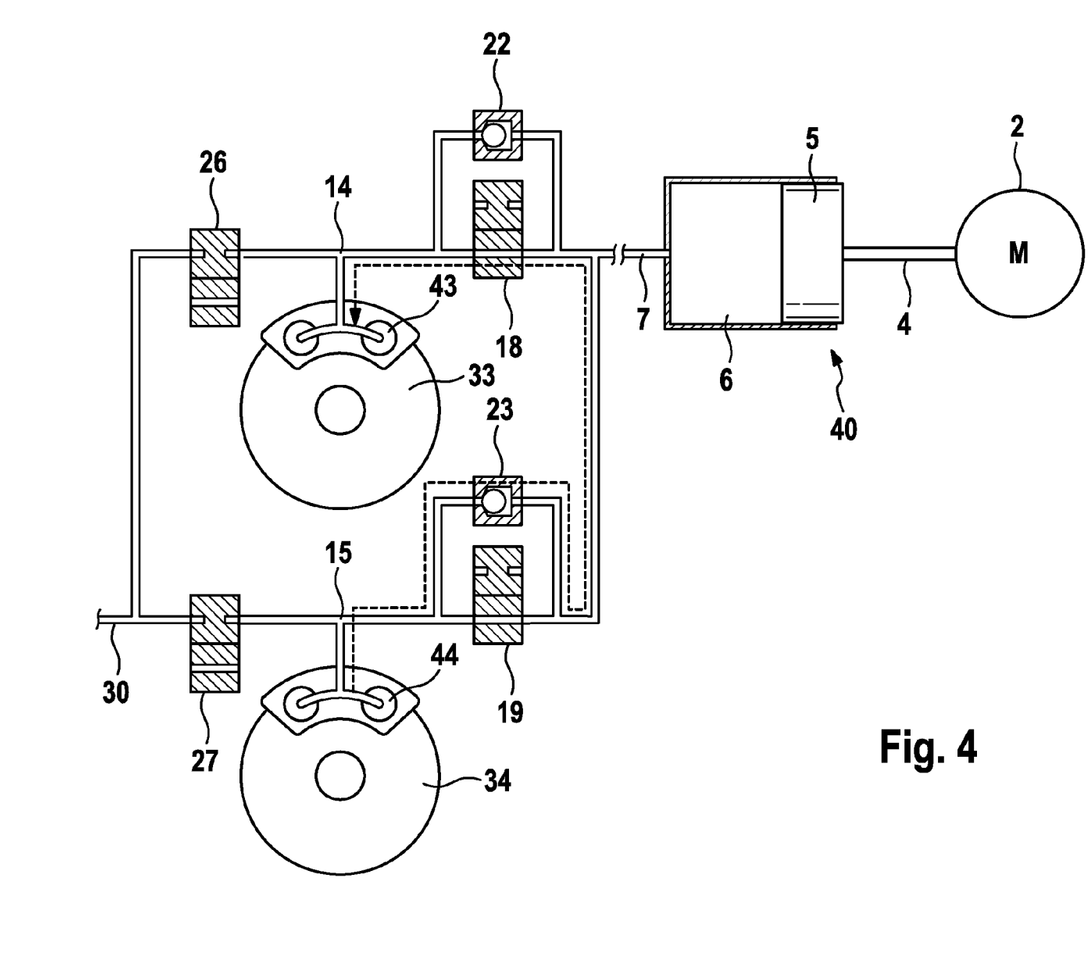
FIG. 4 shows a detail of the brake system from FIG. 1.

A number of d and on is advantages and problems which arise in the case of exclusively closed-loop control of the brake system pressure are explained below with reference to FIGS. 1, 3 and 4. Here, FIG. 3 shows a typical pressure/volume characteristic of a wheel brake and illustrates a volume flow problem which can occur in the brake system shown in FIG. 1 in the case of exclusively closed-loop control of the brake system pressure when pressure has to be built up in a wheel, the previous pressure level of which was below the set brake system pressure of the pressure space 6. The hydraulic subsystem in FIG. 4 illustrates this problem at the hydraulic level.

For technical reasons, it is advantageous that the rigidity of the pressure space 6 should be very high in comparison with the rigidity of the wheel brakes 14-17. In particular, this allows a rapid wheel brake pressure buildup in the case of emergency braking. If the space 6 itself were to have high elasticity (low rigidity), not only would the electric motor 2 have to perform a rotary motion to fill the wheel brakes but an additional angle of rotation would also be necessary to expand the space 6.

However, the required high rigidity of the space 6 has some disadvantages from the point of view of closed-loop control. On the one hand, it is difficult to set the brake system pressure $P_{sys}$ quickly and precisely if the inlet valves 18-21 are closed simultaneously, e.g. during an ABS control operation at the four wheels. The proposal in DE 10 2011 077 329 A1 is therefore as far as possible to keep the inlet valve of the wheel brake with the highest brake pressure open at all times, even during an ABS control operation, and to adjust the brake system pressure precisely to the level of this wheel brake, even if the driver is demanding a higher brake pressure. With this control principle, the rigid space 6 is therefore always connected to at least one wheel brake, i.e.

a flexible load. This makes it possible to set the brake system pressure $P_{sys}$ in a stable manner (without oscillations).

Another disadvantage of the high rigidity of the space 6, however, is the very low volumetric capacity of the pressure space 6. If, for example, one wheel at a pressure below the brake system pressure $P_{sys}$ is connected up by opening the associated inlet valve in order to obtain an increase in the wheel pressure, the brake system pressure initially collapses since the pressure medium volume necessary for the pressure buildup cannot be supplied as quickly from the rigid pressure space 6.

The following balance calculation using an example is intended to illustrate this situation. It is assumed that a brake system pressure $P_{sys}$ of 100 bar has been set in the pressure space 6, corresponding exactly to the current brake pressure $p_{fr,act}$ at wheel brake 44 (e.g. front right-hand wheel). The inlet valve 19 of this wheel brake is therefore operated open. Wheel brake 43 (e.g. front left-hand wheel) is at a pressure level $p_{fl,act}$ of 60 bar and requires an increase of $\Delta p_{fl,req}$ (e.g. 4 bar) to the desired final value $p_{fl,req}=p_{fl,act}+\Delta p_{fl,req}=64$ bar. These conditions are illustrated in FIG. 3. FIG. 3 shows an illustrative pressure/volume characteristic of a wheel brake as assumed here, according to the example, for the front wheel brakes 43, 44. The characteristic illustrates that, as the pressure medium volume V (in cubic centimeters, ccm) increases, the brake pressure p (in bar) in the wheel brake rises continuously and in a slightly progressive manner since the wheel brake becomes more rigid as the pressure medium volume grows, and therefore the elasticity decreases. Wheel brake 44 is at operating point 50, i.e. has a brake pressure of 100 bar with a brake pressure volume received of 1.4 ccm. The brake pressure in wheel brake 43 is at 60 bar at operating point 51, with a volume of 1.1 ccm, and is supposed to be increased to 64 bar. According to the pressure/volume characteristic, a pressure medium volume of 1.14 ccm is necessary for this purpose, and therefore the current volume in wheel brake 43 must be increased by 0.04 ccm. Given a knowledge of the brake system pressure $P_{sys}$ of 100 bar and the wheel brake pressure of 60 bar, there is a pressure difference of 40 bar across the inlet valve 18. Using a simple model calculation which is known per se, it is possible to calculate how long inlet valve 18 must remain open in order to obtain a pressure rise of 4 bar under these boundary conditions. A typical value here is about 5 ms (ms: milliseconds). If valve 18 is opened for this calculated time, therefore, an additional pressure medium volume of 0.04 ccm ideally flows into wheel brake 43, as a result of which the desired pressure increase by 4 bar is obtained.

As already explained above, the pressure space 6 is ideally infinitely rigid, i.e. has no elasticity from which the pressure medium volume can be supplied. The piston 5 would therefore have to deliver the additional pressure medium volume required within the short opening time of inlet valve 18. However, in the case of a pure (exclusively) closed-loop control operation, which involves holding the brake system pressure $P_{sys}$ at the desired level of 100 bar according to the example, this is technically impossible since this short-term additional volume requirement acts as a disturbance for the closed-loop control operation on the brake system pressure, while the system pressure demand remains constant, and the system responds to the effect of said disturbance with a corresponding manipulated variable. To do this, the controller would have to detect, within the short valve opening time of 5 ms, for example, that the brake system pressure $P_{sys}$ is collapsing below the desired level of 100 bar and would then have to control the electric motor 2 in such a way that the brake system pressure was adjusted precisely back to the level of 100 bar. Owing to the finite sampling times in the measurement of pressure values (for the actual value of the brake system pressure) but also, in particular, owing to the delays in the feeding in of the current and due to instances of inertia in the actuator (motor 2, mechanism 4), it is virtually impossible for the pressure to be compensated within time intervals of less than 20 ms.

The pressure medium volume which flows into wheel brake 43 during the pressure buildup is therefore taken at least temporarily from some other pressure medium source than the pressure space 6. This process is illustrated by FIG. 4, which shows a detail of the brake system from FIG. 1, in which only the two front wheel brake circuits 14, 15 with their wheel-specific inlet and outlet valves and the pressure supply device 40 are shown for reasons of simplicity. Since the pressure supply device 40 cannot supply the required pressure medium volume for wheel brake 43 so quickly, the pressure medium volume is supplied from wheel brake circuit 15 (wheel brake 44), which is likewise subject to high pressure and, by virtue of its elasticity, also has the required capacity. In the extreme case of an infinitely rigid pressure space 6 with zero elasticity, the entire volume of 0.04 ccm would be taken from wheel brake 44. The corresponding path of the pressure medium volume flow is illustrated in FIG. 4 by the arrow in dashed lines. Even if inlet valve 19 were closed in order to prevent this "crossflow", it would take place—as illustrated—via check valve 23, which is open in this direction and often has a significantly larger cross section than the orifice in inlet valve 19. The exchange of pressure medium volume from 15 to 14 therefore even takes place relatively quickly. Owing to this effect, the desired pressure buildup in wheel brake 43 is fully or at least partially achieved, albeit with the consequence of an unwanted pressure reduction in wheel brake 44. This is likewise illustrated by way of example in FIG. 3. In accordance with the pressure/volume characteristic, the volume removal of 0.04 ccm from wheel brake 44 at 100 bar leads to a pressure reduction of 6.4 bar to 93.6 bar at wheel brake 44 since wheel brake 44 is significantly more rigid at operating point 50, i.e. has a smaller capacity, then wheel brake 43 at operating point 51. Owing to the hydraulic connections, the brake system pressure $P_{sys}$ also falls approximately to a value of 93.6 bar. In the subsequent period, the pressure controller would detect and eliminate this system deviation with respect to the desired 100 bar. Since wheel brake circuit 15 has the highest of the wheel brake pressures and therefore is controlled with inlet valve 19 open, the pressure medium volume would then be displaced directly from the pressure space 6 into wheel brake circuit 15.

The processes described in simplified form here with reference to FIGS. 3 and 4 are more complex but similar in principle in reality with four wheel brake circuits. The wheel brake which does not have the highest wheel brake pressure and at which a pressure buildup is to be carried out is always supplied with pressure medium volume fractions to a greater or lesser extent from the other wheel brakes at higher pressure levels but also to a small extent from the pressure space 6 of non-infinite rigidity. Owing to the hydraulic resistances of the sequence valves 9, 10, the high pressure wheel brake in the same brake circuit will generally be the main supplier of the pressure medium volume required in the short-term, and therefore it is primarily the wheel brake pressure thereof which can collapse in an unwanted way. In the case of an ABS control operation close to the physical optimum, this effect can therefore entail an impermissible loss of power and, owing to the pressure fluctuations, also premature destabilization of the high-pressure wheel.

In order to eliminate the disadvantages mentioned, according to the invention open-loop control of the pressure medium volume of the pressure supply device is therefore carried out at certain times instead of closed-loop control of the brake system pressure, that is to say closed-loop control of the brake system pressure is replaced at certain times by open-loop volume control. A combined concept is therefore carried out, consisting of closed-loop system pressure control and open-loop volume control, wherein the two principles are each active only in phases and in a mutually exclusive way, depending on the respective pressure modulation situation of the vehicle brakes.

Open-loop volume control is preferably activated whenever at least one wheel brake circuit requires an independent pressure buildup.

A switchover to closed-loop system pressure control is preferably carried out when all the wheels are to be held at an unchanged pressure level or require an independent pressure reduction by means of their respective outlet valves 26-29. A possible error, which can occur in principle in an open-loop volume control phase, can therefore be balanced out again directly by a subsequent closed-loop brake system pressure control phase. It is therefore not possible for a large control error to accumulate in the course of prolonged operation of the system (as will be described below in greater detail).

It has been found that pure, high-precision open-loop control of the pressure supply device is not possible. This can be attributed to the fact that open-loop (feedforward) control is advantageous if open-loop control is based on reliable modeling of the controlled system. For the setting of the brake pressure, this means that essentially good models for the wheel brakes, i.e. precise pressure/volume characteristics for the respectively installed brakes, should be known. Since parameter variance must always be expected, given a large number of vehicles equipped and the wear and aging of components which occurs in driving operation etc., pure open-loop control is not a worthwhile possibility in this sector.

Figure 5:
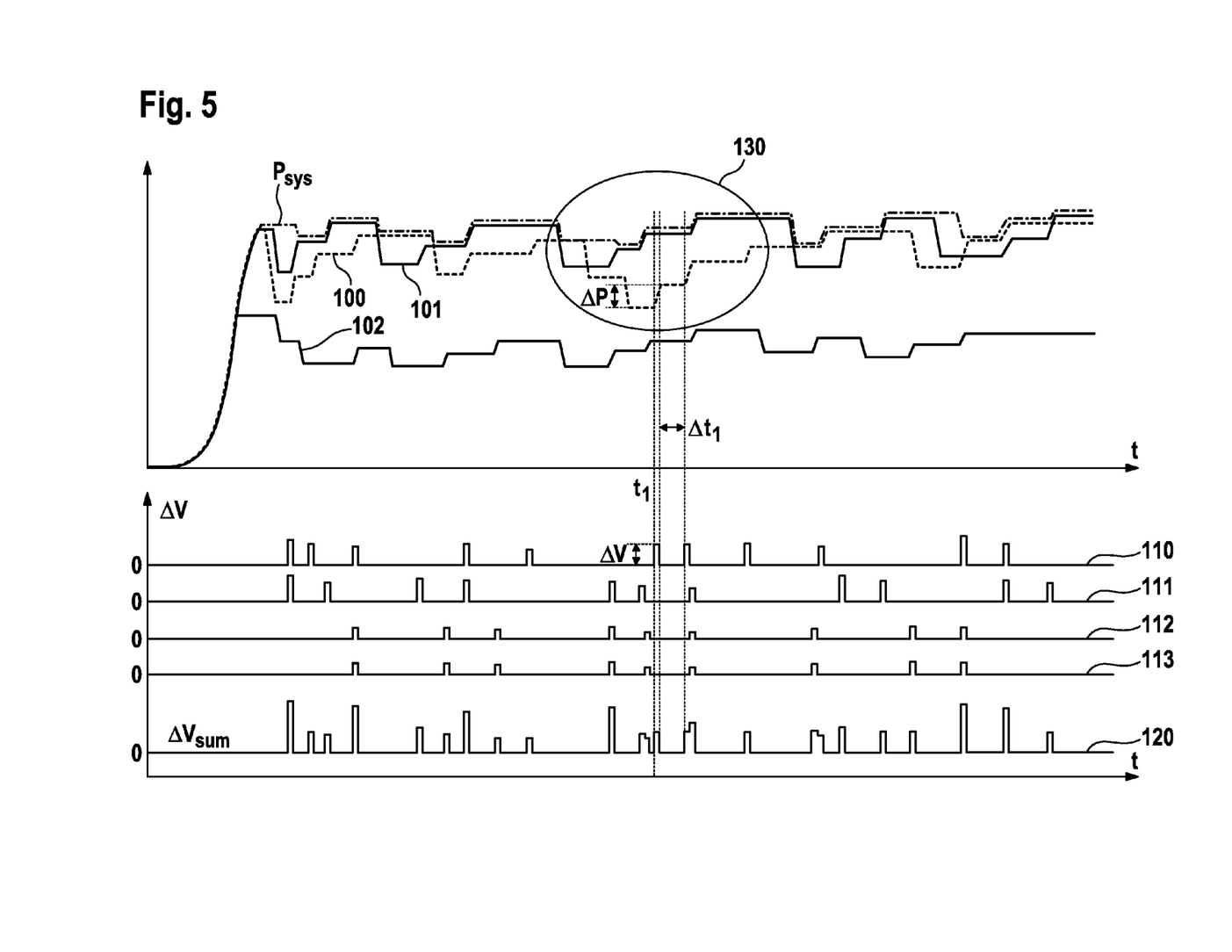
FIG. 5 shows time profiles, according to an example, for the pressure and volume requirement of wheel brakes during an ABS-controlled braking operation.

To explain a method according to the example, a description of an open-loop volume control operation according to the example will be given below. In this connection, FIG. 5 shows a typical example of a wheel-specific pressure modulation during an antilock control operation (ABS) at the four vehicle wheels of a motor vehicle. The time profiles of the wheel brake pressures are shown in the upper diagram in FIG. 5. Here, signal 100 shows the brake pressure $p_{43}$ in the front left-hand wheel brake, signal 101 shows the brake pressure $p_{44}$ in the front right-hand wheel brake and signal 102 shows the brake pressure $p_{45}$ ($p_{45}=p_{46}$) in the two rear wheel brakes. It is assumed that, for reasons of stability, the two rear wheel brakes are always braked equally with the pressure demanded by the respective rear wheel most at risk of locking up. The time profile of the signal of the brake system pressure $P_{sys}$, i.e. the pressure set in pressure space 6, is furthermore shown in the upper diagram in FIG. 5. The brake system pressure $P_{sys}$ is always at or somewhat above the pressure level in the wheel brake with the respectively highest pressure requirement.

The pressure medium volume requirement $\Delta V$ of the wheel brakes (additional pressure medium volume, with which the respective pressure buildup is achieved) during the current ABS control operation is shown against time t in the lower diagram in FIG. 5. Here, signal 110 shows the volume requirement $\Delta V_{43}$ of the front left-hand wheel brake 43, signal 111 shows the volume requirement $\Delta V_{44}$ of the front right-hand wheel brake 44, and signals 112 and 113 shows the volume requirement fractions $\Delta V_{45}$ and $\Delta V_{46}$ of the two rear wheel brakes 45, 46. Signal 120 represents the respective total volume requirement $\Delta V_{sum}$ of the wheel brakes in a time segment, being obtained as follows: $\Delta V_{sum}=\Delta V_{43}+\Delta V_{44}+\Delta V_{45}+\Delta V_{46}$. The volume requirement $\Delta V_j$ for a wheel brake j is calculated from the respectively desired pressure increase at this wheel brake, preferably by means of a specified pressure/volume characteristic. Here, the desired pressure increases at the wheel brakes are known from the closed-loop brake control function. Each closed-loop brake control function, e.g. ABS or TCS (traction control) or ESC (electronic stability control), produces wheel-specific setpoint pressure values (setpoint wheel pressures $p_i$) as output variables, as shown in the upper diagram. If a pressure increase $\Delta P$ is demanded by the closed-loop brake control function in a time segment, e.g. at the front left-hand wheel brake 43 at time $t_1$ (signal 100), the resulting volume requirement $\Delta V$ is determined, by means of the pressure/volume characteristic (see also FIG. 3) specified for wheel brake 43, from the known current wheel brake pressure (e.g. 60 bar, operating point 51 on the characteristic) and the pressure buildup $\Delta P$ demanded. The procedure is the same in each time segment for all the wheels controlled, and the necessary total volume requirement $\Delta V_{sum}$ (signal 120) is then performed.

The system then checks whether the total volume requirement $\Delta V_{sum}$ in the current time segment is greater than zero, i.e. at least one wheel brake requires a pressure buildup. In this case, the system switches over from a closed-loop control of the brake system pressure to open-loop volume control. Starting from the current position s, the open-loop and closed-loop control unit 1 then immediately advances the piston 5 by a distance $\Delta s$ (to the left in FIG. 1)—without checking the brake system pressure $P_{sys}$ which temporarily arises as a result—the distance $\Delta s$ being chosen so that the piston 5 displaces the required total volume $\Delta V_{sum}$. The distance $\Delta s$ is calculated according to the following equation (1), for example:

$$\Delta s = \Delta V_{sum}/(\pi^*(d/2)^2)$$

Here, $(\pi^*(d/2)^2)$ represents the area of the piston 5, which is usually cylindrical, with d being the diameter of the piston.

Thus, based on the volume requirement determined, closed-loop control of the system pressure is replaced at certain times by open-loop volume control in order to eliminate the problems illustrated by means of FIG. 3 and FIG. 4.

One advantage of open-loop volume control is that a movement of the motor for the purpose of displacing a volume is set in motion already on the basis of the demand for a pressure increase at one or more wheel brakes, not just when a pressure loss of the kind that would occur with pure closed-loop pressure control is observed from measurement of the brake system pressure $P_{sys}$.

The volume displacement preferably takes place largely simultaneously with the opening of the respective inlet valve or of the inlet valves (in the case where a plurality of wheel brakes simultaneously demand a pressure increase). A precise time correlation between the two processes (piston movement and valve opening) is desirable but not absolutely essential, as the following consideration with reference to FIG. 6 shows.

Figure 6:
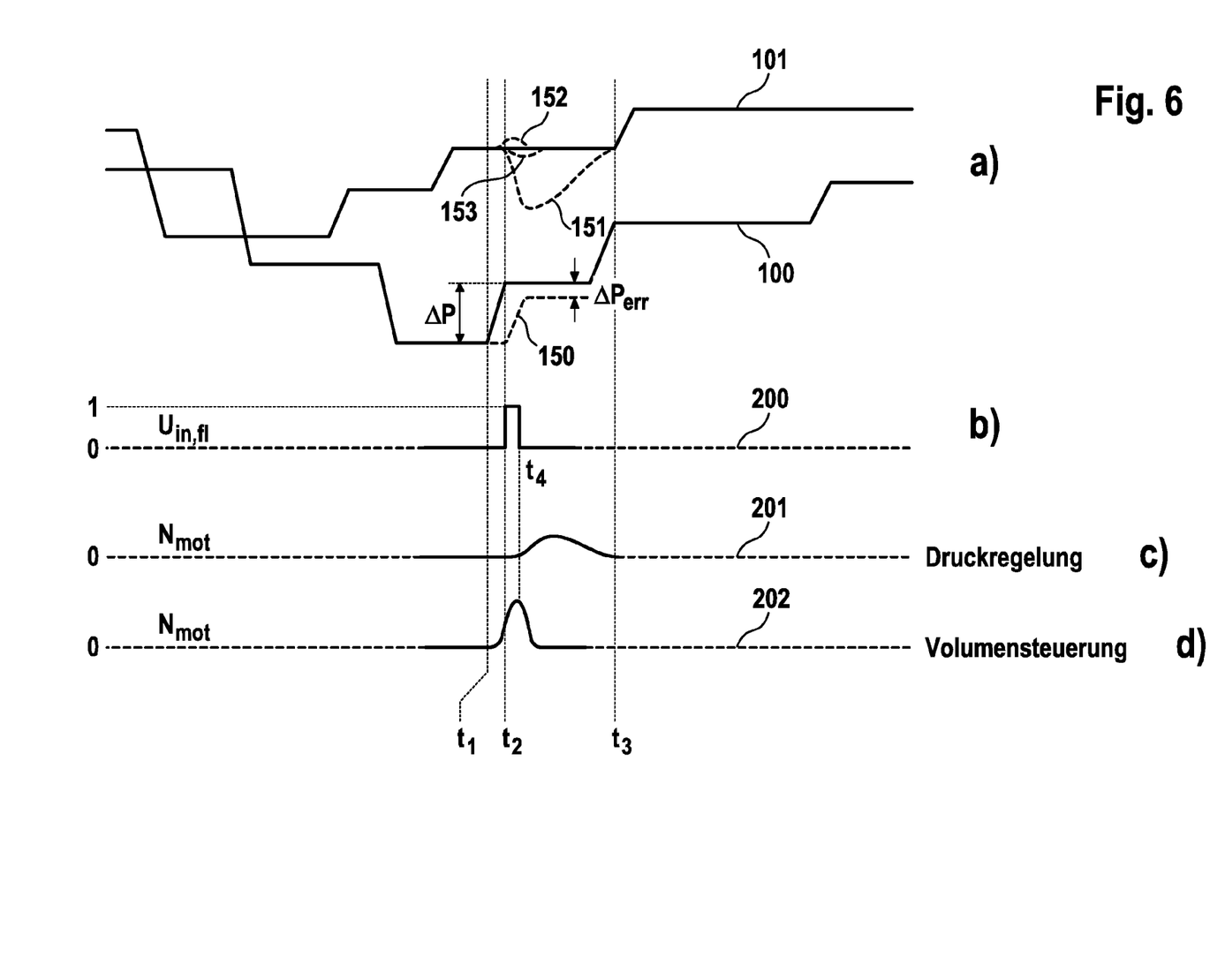
FIG. 6 shows a detail of FIG. 5 with the comparison of wheel-brake profiles during closed-loop pressure control or open-loop volume control.

In the upper diagram a) in FIG. 6, the time domain indicated by 130 in FIG. 5 is shown on an enlarged scale, wherein signal 100 is shown for the ideal pressure profile with respect to time at the front left-hand wheel brake 43 and signal 101 is shown for the pressure profile at the front right-hand wheel brake 44. At time $t_1$, the ABS control system decides that the pressure at the front left-hand wheel brake 43 should be increased by an amount ΔP. The control $U_{in,fl}$ (signal 200) of the inlet valve 18 of the front left-hand wheel brake 43 is shown in diagram b) in FIG. 6. Control $U_{in,fl}$ advantageously takes place with a slight time delay logically and physically (here at time $t_2$). As already explained, there would be a pressure equalization process between the two front wheel brakes in the case of pure (exclusively) closed-loop pressure control for the (brake) system pressure $P_{sys}$. As a departure from the desired pressure profiles 100 and 101, the pressure buildup in the front left-hand wheel brake 43 would in reality take place in accordance with the illustrated signal profile 150 with a time delay $t_2$–$t_1$, this being normal and already taken into account in the control algorithm (here ABS).

The likewise already explained unwanted effect of closed-loop pressure control consists in the collapse of the brake pressure at the front right-hand wheel brake 44, as illustrated in signal profile 151, since a volume bypass flow ("cross-flow") from the right-hand to the left-hand wheel brake circuit occurs before the electric motor 2 can compensate the effect by correction using the piston 5. The motor speed $N_{mot}$ of the electric motor 2 in the case of closed-loop pressure control is shown as signal 201 in the diagram c) in FIG. 6. As can be seen from signal 201, the correction takes place only after the brake pressure in the front right-hand wheel brake (signal 151, identical with $P_{sys}$) has collapsed. Closed-loop pressure control must furthermore be moderate (avoiding excessive loop gain) to prevent the entire pressure control circuit from being excited and hence becoming unstable. In the case of closed-loop control, the motor speeds $N_{mot}$ are therefore relatively low (shallow signal profile of 201).

Another problem of closed-loop control can consist in the fact that the pressure increase at the low-pressure wheel brake, i.e., in this case, in the front left-hand wheel brake, signal 150) is not the precisely desired increase, despite a correctly defined valve activation time (see signal 200), and therefore there is a permanent deviation $\Delta P_{err}$ (see signals 100 and 150). This is due to the hydraulic resistances of the valves situated between the wheel brake circuits. In principle, the piston 5 with its capacity to displace volume with a high force would be capable of delivering the volume into the wheel brake circuit even against these resistances, but it no longer has any effect on the low-pressure wheel brake since the inlet valve thereof has already closed again before piston 5 displaces additional volume. This volume then only enters the open high-pressure brake circuit of the right-hand front wheel and ensures the delayed pressure correction there (see signal 151), which is complete only at approximately time $t_3$. In the example shown, a new pressure increase is demanded at the front left-hand wheel brake (signal 100) even before this time $t_3$, and this would once again lead to a similar pressure collapse at the front right-hand wheel brake (not shown here).

The example illustrates the problems of pure closed-loop control of $P_{sys}$. As already mentioned, the unwanted system deviations (signal profiles 150 and especially 151) would lead to noticeable losses of comfort and performance within an ABS control operation.

With open-loop volume control, in contrast, significantly more precise pressure modulation can be accomplished, as is likewise illustrated in FIG. 6. In this connection, signal 202 for the motor speed $N_{mot}$ of the electric motor 2 in the case of open-loop volume control is shown in diagram d) in FIG. 6. In the case of open-loop control, the system detects at time $t_1$ that a pressure buildup by an amount ΔP in accordance with signal 100 is desired at the front left-hand wheel brake 43. The volume ΔV required for this purpose is determined by means of the pressure/volume characteristic of wheel brake 43, and electric motor operation at high speed (see signal 202) is immediately activated in order to traverse the piston travel Δs required according to equation (1).

As regards the piston position s set, this is also a closed-loop control operation (closed-loop position control) since the piston position s is set precisely. For this purpose, according to the example, the open-loop and closed-loop control unit 1 continuously measures the position s by an indirect method, in which the angular position of the motor, which is directly correlated with the piston travel s, is detected. This should be known in any case for efficient closed-loop control of a multiphase motor (e.g. synchronous machine). This internal closed-loop control system (internal control loop) operates at a very high frequency and can be carried out with a high loop gain, and therefore relatively high motor speeds $N_{mot}$ are possible (indicated in signal profile 202). As regards the brake system pressure $P_{sys}$ set, this is, in the case of the volume displacement, a pure open-loop control operation (and therefore the term "open-loop control" is also used here, even though the piston position itself is also subject to closed-loop control). Ideally, the brake system pressure $P_{sys}$ remains constant at the previously achieved level during the volume displacement.

The early starting of the electric motor and the high speeds make it possible to make the movement of the piston coincide in time with the valve opening time. If this is not fully achieved owing to the limited dynamics of the piston 5, the brake circuit of the high-pressure wheel automatically acts as a kind of dynamic buffer. It may therefore be that the wheel brake of the high-pressure wheel briefly supplies some pressure medium volume which the piston 5 cannot fully deliver in real time, or that the high-pressure wheel brake temporarily receives some pressure medium volume which the piston 5 cannot as yet displace into the wheel brake circuit of the low-pressure wheel brake owing to the fact that the inlet valve thereof is not yet open. However, these equalization processes lead only to relatively small fluctuations in the pressure profile of the high-pressure wheel brake, as indicated by signal profiles 152 (slight temporary pressure increase) and 153 (slight temporary pressure decrease) in FIG. 6 a).

In the event that a plurality of wheel brakes simultaneously require a pressure increase (in one time segment), it must be ensured that precisely the right volume enters the respective wheel brake circuit when displacing the total volume. According to a preferred method, this is achieved by means of the individually set activation time (opening time) of the respective inlet valve (see, for example, time interval $t_4$–$t_2$ of signal 200 in FIG. 6). It is advantageous if the activation time (opening time) is calculated separately for each wheel brake circuit from the level of the desired pressure increase, the pressure difference across the associated inlet valve, the operating point (current pressure in the wheel brake) and the characteristics of the orifice of the inlet valve. Model calculations of this kind are known per se and are therefore not explained in detail here.

As already mentioned, open-loop volume control is preferably only ever activated in time segments in which at least one wheel brake requires a pressure buildup, i.e. pressure medium volume, and in which therefore at least one inlet valve is activated for this purpose. In the other time segments, the system preferably switches to closed-loop pressure control, which sets the brake system pressure $P_{sys}$ firmly to the level required by the highest-pressure wheel brake or—depending on the control strategy selected—to a level slightly above this. One such phrase is time interval $\Delta t_1$ in FIG. 5, for example, which is shown on an enlarged scale in FIG. 7. In this phase, the open-loop and closed-loop control unit 1 tries to adjust the system pressure $P_{sys}$ to the pressure level required by the front right-hand wheel brake (signal 101) or, according to the example, slightly above this level.

Although $P_{sys}$ does not need to be modulated at all in time interval $\Delta t_1$ since the pressure achieved can actually be held constant, a closed-loop pressure control operation is nevertheless activated and carried out according to the example. The reason for this preferred correction is that an error may have occurred during the preceding open-loop control operation owing to models which are not completely accurate. If, for example, the pressure medium volume $\Delta V$ calculated for the pressure buildup $\Delta P$ at the front left-hand wheel brake (signal 100) by means of the pressure/volume characteristic does not correspond completely to the actually necessary volume requirement owing to a change in the brake characteristics, i.e. said calculated pressure medium volume is too small, for example, less pressure medium volume is displaced by piston 5 than the wheel brake actually absorbs. The remaining pressure medium volume is then automatically supplied by the wheel brake of the high-pressure wheel, with the result that the pressure thereof collapses a little. At the high-pressure wheel brake, the pressure dip 154 (dashed line) shown by way of example in FIG. 7, i.e. a deviation $\Delta P_{err}$ from the desired level of the ideal signal 101, then occurs at the high-pressure wheel brake. $P_{sys}$ also falls to approximately the same level 154, this being detected as a system deviation at the beginning of interval $\Delta t_1$ by the open-loop and closed-loop control unit 1 and being eliminated in the closed-loop pressure control mode.

In a (following) closed-loop control phase unavoidable errors which may occur during the preceding open-loop control operation are therefore compensated if the behavior of the system components does not quite correspond precisely to the model. However, the errors or unwanted modulations are generally so small that they are negligible in comparison with the pressure dips which occur with a pure closed-loop pressure control operation. However, subsequent closed-loop pressure control phases, as described with reference to the example $\Delta t_1$, for example, are advantageous in order to avoid errors which accumulates over a plurality of more prolonged wheel pressure modulations.

However, in order to further reduce or, ideally, completely eliminate even these small errors in the course of a closed-loop control operation, a learning method is additionally carried out according to the example, based on the measurable deviation $\Delta P_{err}$ from the setpoint value for $P_{sys}$.

According to the example, a model correction or correction of the respectively calculated volume requirement is carried out by means of the steps shown below:

a) Fundamentally, a required correction factor (see points b), c), d), e)) is determined only if pressure has been built up at an individual wheel and a minimum time interval of 10 ms in which no other wheel demands a pressure buildup then occurs.

b) The system pressure deviation $\Delta P_{err}$ (see FIG. 7) which can be detected immediately after the pressure buildup is used to determine a volume error $\Delta V_{err}$. Since the highest-pressure wheel brake was the volume supplier and has caused the system pressure deviation $\Delta P$ err with the volume discharge, the volume error $\Delta V_{err}$ is calculated from the p/V characteristic thereof and from the pressure level achieved thereby (corresponding to a view in FIG. 3). If a plurality of wheel brakes are highest-pressure wheel brakes, i.e. are connected directly to the pressure space 6 via open inlet valves, $\Delta V_{err}$ is determined from all these wheel brakes in accordance with the above consideration.

c) The volume error $\Delta V_{err}$ is then put in relation to the previous volume calculation $\Delta V$ for the wheel brake subject to a pressure buildup, and a correction factor $K_{mod}$ is formed therefrom, e.g. as follows:

$$K_{mod}=(1+(\Delta V_{err}/(2*\Delta V)))$$

Calculation of a correction factor $K_{mod}$ in accordance with the relation $$K_{mod}=(1+(\Delta V_{err}/\Delta V))$$

is also conceivable. However, it is advantageous in the case of such correction methods not to try to fully compensate for a detected error in the next step since this can lead to instability of the correction itself (continuous toggling of the factor). A correction with the moderate factor $K_{mod}$, which tends to lead to asymptotic error elimination, is advantageous.

d) Correction factors $K_{mod,i}$ for various pressure ranges i (e.g. for 0-10 bar, 10-20 bar, 20-35 bar, 35-50 bar, 50-70 bar, 70-100 bar and 100-200 bar) are stored for each wheel brake, in a table for example. If therefore a volume error occurs owing to the pressure increase at one wheel brake, which was previously at pressure level P, the calculation of the correction factor $K_{mod}$, as described in c) is carried out. This factor is entered into the field for the pressure value P in the table intended for the wheel if the field is still empty. If a correction factor has already been entered there, the product of the current factor with the already stored factor is formed and stored as a new correction factor in the same field.

e) If an independent pressure buildup is carried out at one wheel brake, the volume $\Delta V$ necessary for this purpose is first of all calculated. The current pressure level P is then used to address the corresponding field in the correction table for this wheel. If a correction factor has been stored there, a corrected volume requirement is determined according to the equation:

$$\Delta V_{korr}=K_{mod}*\Delta V$$

Figure 7:
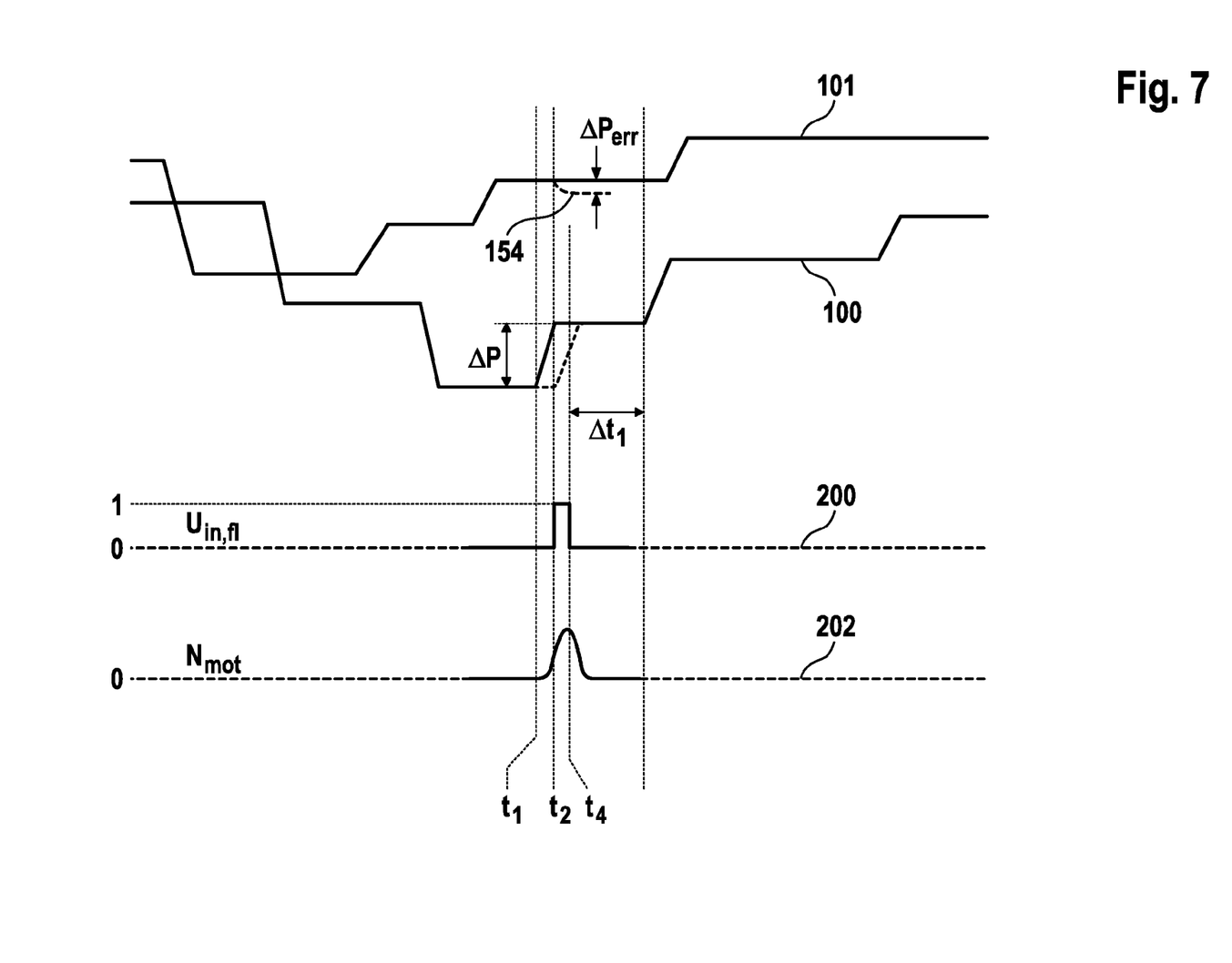
FIG. 7 shows a detail of FIG. 5 with wheel brake pressure profiles intended to illustrate a correction method in accordance with one example.

Finally, it should be noted that, for the sake of clarity, signals 200, 201 and 202 and the system deviations which occur have been illustrated with realistic values only for a short time interval after $t_1$ in FIGS. 6 and 7 and, in the remaining time periods, have been illustrated in dashed lines or not at all, in order to highlight the actions and effects only of the indicated pressure buildup $\Delta P$.

While the above description constitutes the preferred embodiment of the present invention, it will be appreciated that the invention is susceptible to modification, variation and change without departing from the proper scope and fair meaning of the accompanying claims.

The invention claimed is:

1. A method for operating an electrohydraulic brake system for motor vehicles of the type having a wheel-specific closed-loop brake control function and hydraulically actuable wheel brakes, which are each disconnectably connected to an electrically controllable pressure supply device via an inlet valve, the pressure supply device having a cylinder-piston arrangement with a hydraulic pressure space, and a piston which can be moved by an electromechanical actuator in order to set a brake system pressure, and which wheel brakes are each connected or can be connected to a pressure medium reservoir via an outlet valve, wherein a wheel-specific setpoint wheel pressure is specified for each wheel brake, comprising the steps of:
- determining and setting a setpoint value for the brake system pressure;
- carrying out a closed-loop pressure control of the brake system pressure of the pressure supply device, wherein a measured actual brake system pressure is adjusted to the setpoint value of the brake system pressure;
- determining that a wheel-specific brake pressure increase is to be carried out for at least one wheel brake and, in response thereto, carrying out a switchover from closed-loop pressure control of the brake system pressure to an open-loop control of the pressure medium volume which is output by the pressure supply device in accordance with the setpoint wheel pressures which are specified for the each of the wheel brakes; and
- carrying out the open-loop control of the pressure medium volume instead of the closed-loop control of the brake system pressure.

2. The method as claimed in claim 1, further comprising, in the closed-loop pressure control of the brake system pressure, adjusting the brake system pressure to a highest setpoint wheel pressure of the wheel specific setpoint wheel pressures or to a setpoint pressure that is higher than the highest setpoint wheel pressure by a specified amount.

3. A method for operating an electrohydraulic brake system for motor vehicles of the type having a wheel-specific closed-loop brake control function and hydraulically actuable wheel brakes, which are each disconnectably connected to an electrically controllable pressure supply device via an inlet valve, the pressure supply device having a cylinder-piston arrangement with a hydraulic pressure space, and a piston which can be moved by an electromechanical actuator in order to set a brake system pressure, and which wheel brakes are each connected or can be connected to a pressure medium reservoir via an outlet valve, wherein a wheel-specific setpoint wheel pressure is specified for each wheel brake, comprising the steps of:
- carrying out a closed-loop pressure control of the brake system pressure of the pressure supply device;
- carrying out at certain times an open-loop control of the pressure medium volume which is output by the pressure supply device instead of the closed-loop pressure control of the brake system pressure;
- carrying out a switchover from closed-loop pressure control of the brake system pressure to the open-loop control of the pressure medium volume in accordance with the setpoint wheel pressures which are specified for the wheel brakes;
- carrying out the switchover to the open-loop control of the pressure medium volume in response to determining that a wheel-specific brake pressure increase is to be carried out for at least one wheel brake.

4. The method as claimed in claim 1, further comprising, during the open-loop control of the pressure medium volume, moving the piston by a position value, with the result that a pressure medium volume determined by means of the specified setpoint wheel pressures is displaced into at least one wheel brake.

5. The method as claimed in claim 4, further comprising determining the position value by using at least one pressure/volume characteristic specified for the wheel brake or the wheel brakes.

6. The method as claimed in claim 4, wherein, in the case of a brake pressure increase at two or more wheel brakes simultaneously, determining the position value by a sum of pressure medium volumes of the wheel brakes that is required for the brake pressure increase at the two or more wheel brakes.

7. The method as claimed in claim 6, wherein a wheel-specific brake pressure increase at the two or more wheel brakes is provided through wheel-specific opening durations for the corresponding inlet valves.

8. The method as claimed in claim 1, further comprising carrying out, after the completion of a phase of the open-loop control of the pressure medium volume, a phase of the closed-loop pressure control of the brake system pressure.

9. The method as claimed in claim 8, further comprising switching the system from the open-loop control of the pressure medium volume to the closed-loop pressure control of the brake system pressure when either holding or reduction of the brake pressure is to be carried out for each of the wheel brakes.

10. The method as claimed in claim 8, further comprising determining, at the beginning of the closed-loop pressure control phase, a deviation between the measured brake system pressure and the brake system pressure specified by the closed-loop brake control function, and carrying out a correction of a model for open-loop control of the pressure medium volume using the deviation.

11. The method as claimed in claim 10, further comprising determining a wheel-specific correction factor, using the deviation and a pressure/volume characteristic, and determining the factor in accordance with the wheel brake pressure.

12. The method as claimed in claim 11, further comprising determining a corrected pressure medium volume for a wheel brake in a subsequent phase of the open-loop control of the pressure medium volume using the correction factor.

13. A brake system for motor vehicles comprising:
- a wheel-specific closed-loop brake control function,
- a plurality of hydraulically actuable wheel brakes,
- an electrically controllable pressure supply device, having a cylinder-piston arrangement with a hydraulic pressure space, and a piston which can be moved by an electromechanical actuator, wherein each of the wheel brakes is disconnectably connected to the pressure supply device via an inlet valve and is connected or can be connected to a pressure medium reservoir via an outlet valve,
- a first detection device for determining a brake system pressure of the pressure supply device,
- a second detection device for determining a position of the pressure supply device or the actuator,
- an electronic open-loop and closed-loop control unit for controlling the electromechanical actuator, and
- wherein the control unit is configured to carry out the steps of at certain times providing an open-loop control of the pressure medium volume which is output by the pressure supply device instead of a closed-loop pressure control of the brake system pressure, and carrying out, in response to a determination that a wheel-specific brake pressure increase is to be carried out for at least one wheel brake, a switchover from the closed-loop pressure control of the brake system pressure to the open-loop control of the pressure medium volume in accordance with setpoint wheel pressures which are specified for the wheel brakes.

14. The method of claim 1, wherein the open-loop control is carried out when a wheel specific brake pressure increase is to be carried out in a wheel brake where the previous pressure level of said wheel brake was below the brake system pressure of the pressure supply device.

* * * * *